J. P. DAHL-JENSEN.
PRESSURE DIE FOR INSULATOR PRESSING MOLDS.
APPLICATION FILED OCT. 18, 1915.
1,204,745.
Patented Nov. 14, 1916.
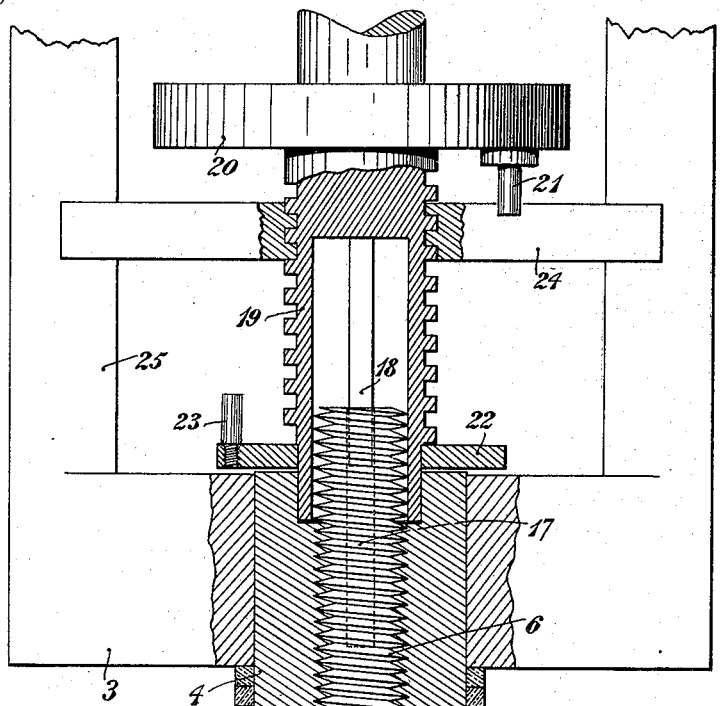
*Fig.1.*
*Fig.2.*
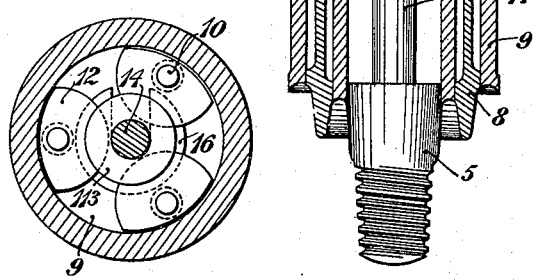

UNITED STATES PATENT OFFICE.

JENS PETER DAHL-JENSEN, OF COPENHAGEN, DENMARK.

PRESSURE-DIE FOR INSULATOR-PRESSING MOLDS.

1,204,745.

Specification of Letters Patent.

Patented Nov. 14, 1916.

Application filed October 18, 1915. Serial No. 56,579.

*To all whom it may concern:*

Be it known that I, JENS PETER DAHL-JENSEN, sculptor, a citizen of the Kingdom of Denmark, residing at Copenhagen, and whose post-office address is No. 16 Valby Langgade, have invented certain new and useful Improvements in Pressure-Dies for Insulator-Pressing Molds, of which the following is a specification.

For making insulators or similar objects, with screw holes and bell rims, by pressing wet or pulverized porcelain composition, or the like, in press molds, it has been proposed to use concentrically divided pressing dies consisting partly of a central screw die for making the screw hole or the central hollow space, and partly an intermediate die for shaping the space between the bell rims, and partly an end die for shaping the lower surfaces of the rims. The hitherto proposed constructions suffer, however, from several drawbacks, especially with respect to the disposing and movement of the intermediate pressing die, and consequently the construction is not reliable in run, and it does not work easily and quickly.

These drawbacks are obviated by means of the present invention, the characteristic feature of which is that the movement of the intermediate pressing die, which is rectilineally axial, is caused by means of the screw die or its moving screw, when the latter approaches its limit-positions.

Furthermore, the invention concerns several peculiar details in this movement transmission between the screw die and the intermediate die, whereby the pressing die as a whole is rendered easy to put together and take apart and can easily be kept free from pressed-out composition.

Furthermore, the invention takes into consideration the possibility that a screwing fast ("screwing into the bottom") of the moving screw of the screw die may be disadvantageous, especially in the mechanical running of the screw die; for since the last stage of the screwing in of this die, whereby the intermediate die is also brought exactly into pressing position, every time has the character of a "screwing into the bottom," that is to say, so that end surfaces on the moving screw or on parts connected therewith are pressed firmly against stationary counter-surfaces by means of the screw movement, when strong friction will occur between these surfaces screwed together so that a considerable initial force will be required to perform the next operation, namely, the screwing out.

Accordingly the invention also embraces special means for preventing the screw from "screwing into the bottom," it being stopped in time, before this happens. Therefore mechanical power can be used for running the screw by means of belt pulley, friction gear, electric motor, or other suitable power devices, which insure an even and reliable run.

The drawing is a longitudinal section of one form of construction in Figure 1 and a transverse section of the same in Fig. 2.

The different pressing die parts are disposed in a hollow main piece, which can be fastened in the pressing member of the machine, which is shown in Fig. 1 as a frame 3. The upper part 4 of the main piece forms a nut for the movable screw 6 of the screw die 5. The lower part 7 of the main piece which moves with the upper part 4 thereof carries transmission members for imparting movement to the intermediate die 8, which is movably inserted in the removable hollow end-die 9. This latter die is fastened at the bottom of the main piece.

In the intermediate die there are screwed fast a number (three) of rods 10, which are passed through holes in the top of the end-die 9, and are guided in other holes 11 in the main piece 4. These rods have crescent-shaped collars 12 which lie in the course of a shoulder 13 on a connecting rod 14 between the die 5 and its screw 6, so that the rods 10, the collars 12, and with them the intermediate die 8, can be raised by the upward movement of screw 6 and rod 14 at a certain advanced stage of the upward movement of the screw 6. When the screw is again screwed in, the die 8, and the rods 10, with their collars 12 will either immediately fall back into place or be mechanically carried back to it by means of the shoulder 13 and another set of like collars which may be arranged lower down on the rods 10. This may also be done by means of the collars 12 as shown and another shoulder 113 arranged above them on the rod 14, as shown in Fig. 2. This may also be accomplished by means of the lower surface 15 of the screw itself.

Fig. 1 shows the die parts in pressing position, with the intermediate die 8 at the lower end of the end die 9, and with the shoulder 15 lying on the collars 12 and the shoulder 13 lying on a ring 16, which rests on the end-die. The pressing is done in the usual manner, by the pressing member 3 being carried down (or in another direction), so that the dies penetrate into the composition in the mold.

After the pressing of the insulator has been completed, the screw 6, rod 14, and screw-die 5, are unscrewed upwardly and at a given point of this unscrewing, namely, when the inner tension in the freshly completed insulator has been equalized, owing to the fact that the screw-die 5 no longer exercises any pressure on the inner wall of the insulator, the collar 13 will engage with the collars 12, and the intermediate die 8 will also be automatically pulled out by the screw. Then the end-die 9, which has been pressed against the freshly completed bell-rims, during the pulling out of the intermediate die 8, can be removed soon thereafter, since the pressing-member 3 is again raised for a new stroke. The end-die 9 and the part 7 can be connected in any suitable manner so as to be separable, as for instance, by screw-threading or any other well-known means, which in themselves form no part of my invention. Thus the movement of the intermediate die takes place quite automatically, without requiring other outer guidance than that which is already necessary for the movement of the pressing member 3 and for turning the screw 6.

The ample space in and between the different dies and around the movable parts prevents the composition pressed out from sticking and obstructing the movements of the dies.

In the described form of construction the putting together and taking apart of the different parts can be done with great ease. In order to take this device apart after the end-die 9 is loosened from the main piece 4, 7, the screw die 5, with the rod 14, and the screw 6, are screwed so far down that the shoulder 13 comes under the lower edge of the main piece, after which the rods 10 are turned so much that the collars 12 are free from the shoulder 13, whose diameter is equal to the largest diameter of the screw 6 or the screw die 5. Then the end-die and the intermediate die can be separated from the screw 6, and after this the ring 16 can also be removed, since, as is shown in Fig. 2, it is cut open and can be held in place by the rods 10. Putting together is done in the reverse order.

When the frame 3, rod 14, and screw 6 are not in one piece, which is not necessary, but is supposed in the shown example, the putting together and taking apart of the die can take place by putting together or taking apart the different parts of the screw. The collars 12, which are mutually independent, can then be united in a closed or cut-open ring, and the guiding of the rods 10 in the holes 11 can be omitted. Furthermore, the shoulder 13 can be a divided ring, which is removably disposed on the connecting rod 14.

When the screw die 5, rod 14, and screw 6, as is already the case in the hitherto proposed hand-operated insulator mold presses, are moved by means of a crank, traction-chains, or the like, and the necessary transmission members, such as conical wheels, sprocket wheels, or the like, there is no disadvantage connected with the screw being "screwed into the bottom," that is to say, in having the shoulder 15 screwed fast against the collars 12 and the shoulder 13 fast against the ring 16, because at the beginning of the unscrewing the workman can easily exercise the extra force required for overcoming the friction between the surfaces which are screwed fast. This is somewhat undesirable, however, when the screw is run by means of mechanical power, as described above, since the mechanical power should preferably meet a constant resistance, and not a resistance which, at the very beginning of the movement, is very much greater than during its continuation. Under such conditions, it is therefore advisable to stop the screw before it has "screwed into the bottom," that is to say, before the contact between the shoulders and their opposite surfaces has yet taken place, or at least before it has become more than purely superficial, that is to say, before the characteristic "screwing together" of the surfaces has taken place. Fig. 1 shows an example of such a stoppage of the screw in its end position.

The screw 6 is by means of a groove 17 and a wedge 18 connected with a driving shaft 19 so as to be longitudinally shiftable upon it but not rotatable thereon. The shaft 19 carries both a disk 20, with downwardly pointing stop-pin 21, and, at a certain distance below it, another disk 22, with an upwardly-pointing stop-pin 23. The shaft 19 is screw-threaded with coarse threads, between these two wheels, and a slide-piece 24 is disposed on this screw to act as a nut. The ends of slide piece 24 can slide on the side pieces 25 of the pressure-frame 3. When the shaft 19 is turned, by means of the disk 20, which may be a friction wheel or belt-pulley, the screw die 5, rod 14, and screw 6 are screwed up or down, and at the same time the slide-piece 24 is also screwed up or down (or the reverse, if the shaft 19 is screw-threaded opposite to the screw 6). When the screw die 5, rod 14, and screw 6 approach their limit or position, the corresponding stop-pin 21 or 23 will still just be able to pass the upper or lower surface of the slide-piece but after another half-turn, by which the screw die 5, rod 14, and screw 6 are brought into their proper extreme position, but without being "screwed into the bottom," the slide-piece and the stop-pin have been brought into the relative positions which are shown at the top of the figure, and the continued turning of the shaft 19 in this direction is prevented.

I have shown one embodiment of my invention, but it is obvious that numerous changes might be made in the details of the embodiment without departing from the spirit of the invention, as defined in the following claims.

I claim:—

1. An insulator die having a movable intermediate die, a movable screw die, said screw-die being independently movable with respect to said intermediate die, and connecting means between said intermediate die and said screw-die, said connecting means automatically causing the movement of said intermediate die, at a given point of the movement of said screw-die.

2. An insulator die having a screw-die, an intermediate die, said screw die being independently movable with respect to said intermediate die, means intermediate said intermediate die and said screw die, said intermediate means automatically causing the movement of said intermediate die when said screw-die has been sufficiently removed from the molded insulator, so as to exert substantially no pressure upon the inner wall of said insulator.

3. An insulator die having a screw die, an intermediate die, said screw-die being independently movable with respect to said intermediate die, and connecting means between said screw die and said intermediate die, said connecting means automatically causing the movement of said intermediate die at a given point in the movement of said screw-die.

4. An insulator die having a screw-die, an intermediate die, said screw-die being independently movable with respect to said intermediate die, said screw-die being provided with a rod extending away therefrom, projecting means on said rod, a movable intermediate die relatively movable with respect to said screw-die, and auxiliary rods connected with said intermediate die, said auxiliary rods having projections capable of being engaged by the projecting means of said first mentioned rod, when said screw-die and its rod are moved, whereby the movement of said screw die causes the movement of said intermediate die.

5. An insulator die having a screw-die, an intermediate die, said screw-die being independently movable with respect to said intermediate die, said screw-die being provided with a rod extending away therefrom, projecting means on said rod, a movable intermediate die relatively movable with respect to said screw-die, and auxiliary rods connected with said intermediate die, said auxiliary rods having projections capable of being engaged by the projecting means of said first mentioned rod, when said screw-die and its rod are moved, whereby the movement of said screw-die causes the movement of said intermediate die, said auxiliary rods with their projections being rotatable, whereby said projections can be brought into and out of the path of the projecting means on said first mentioned rod.

6. An insulator die having a screw-die, an intermediate die, said screw die being independently movable with respect to said intermediate die, said screw-die being provided with a rod, an intermediate die movable with respect to said screw-die, a screw for moving said rod and said screw die, said rod being detachably connected to said screw die.

7. An insulator die having a screw-die, an intermediate die, said screw die being independently movable with respect to said intermediate die, operating means for moving said screw die, and automatic controlling means for automatically stopping the action of said operating means when the parts of said screw-die and of said intermediate die are in a given relation with respect to each other.

8. An insulator die having a screw-die, an intermediate die, said screw die being independently movable with respect to said intermediate die, a rotatable screw having a relatively fixed nut and adapted to move the said screw-die along its axis, and externally threaded rotatable shaft intermediate of said screw for rotating said screw to move said screw-die, a collar mounted on said rotatable shaft so as to rotate therewith, a stop pin projecting from said rotatable collar, and a slide piece mounted on the external threads of said rotatable shaft, so as to be moved along said shaft upon the rotation thereof, and guides for guiding said slide piece in a straight line without permitting the rotation of said slide piece, whereby when said slide piece assumes a definite position with respect to the said collar and its stop pin, the further rotation of said collar and of said rotatable shaft is prevented.

9. An insulator die having a screw-die, an intermediate die, said screw-die being independently movable with respect to said intermediate die, a screw having a relatively fixed nut connected with said screw-die for moving it, a rotatable shaft, said screw being connected with said rotatable shaft so as to be rotated thereby, and means for automatically preventing the rotation of said rotatable shaft when the said screw-die occupies a given relative position with respect to said intermediate die.

In testimony that I claim the foregoing as my invention, I have signed my name in presence of two subscribing witnesses.

JENS PETER DAHL-JENSEN.

Witnesses:
P. HOFMAN-BANG,
ERNEST BOUTARD.

Copies of this patent may be obtained for five cents each, by addressing the "Commissioner of Patents, Washington, D. C."